(12) United States Patent
Geoffrion et al.

(10) Patent No.: US 10,965,602 B2
(45) Date of Patent: Mar. 30, 2021

(54) SOFTWARE ASSISTED HASHING TO IMPROVE DISTRIBUTION OF A LOAD BALANCER

(71) Applicant: Intel Corporation, Santa Clara, CA (US)

(72) Inventors: Carl Geoffrion, Saint-Jean-sur-Richelieu (CA); Simon Perron Caissy, Saint-Constant (CA); Eduardo L. Romero, St Jean sur Richelieu (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/353,763

(22) Filed: Mar. 14, 2019

(65) Prior Publication Data

US 2020/0296048 A1 Sep. 17, 2020

(51) Int. Cl.
| | | |
|---|---|---|
| *H04L 12/851* | (2013.01) | |
| *G06F 9/54* | (2006.01) | |
| *H04L 12/721* | (2013.01) | |
| *H04L 12/743* | (2013.01) | |
| *H04L 12/803* | (2013.01) | |
| *H04L 12/863* | (2013.01) | |
| *H04L 12/935* | (2013.01) | |

(52) U.S. Cl.
CPC .......... *H04L 47/2483* (2013.01); *G06F 9/54* (2013.01); *H04L 45/38* (2013.01); *H04L 45/7453* (2013.01); *H04L 47/125* (2013.01); *H04L 47/6295* (2013.01); *H04L 49/3027* (2013.01)

(58) Field of Classification Search
None
See application file for complete search history.

(56) References Cited

U.S. PATENT DOCUMENTS

| | | | | |
|---|---|---|---|---|
| 6,223,172 | B1* | 4/2001 | Hunter | H04L 45/02 707/741 |
| 6,298,428 | B1* | 10/2001 | Munroe | G06F 12/1018 707/999.1 |
| 6,343,289 | B1* | 1/2002 | Hunter | H04L 12/4641 |
| 6,876,952 | B1* | 4/2005 | Kappler | H04L 1/0018 370/218 |

(Continued)

OTHER PUBLICATIONS

Cao et al, "Performance of Hashing-Based Schemes for Internet Load Balancing", IEEE, INFOCOM 2000, Tel Aviv, Israel, Mar. 26-30, 2000, 10 pages.

(Continued)

*Primary Examiner* — Christopher T Wyllie
(74) *Attorney, Agent, or Firm* — Compass IP Law PC (57) ABSTRACT

Examples include a computing system having a load balancer circuitry to assign data units to destinations using a hash function having a plurality of hash bins, each hash bin being associated with a destination. The computing system includes a hash adjuster to assign a destination to each of the plurality of hash bins, sample assignment of data units to hash bins by the load balancer circuitry over a sample window, analyze the sampled assignments, and reassign destinations to the hash bins based at least in part on the analyzed sampled assignments. This results in increased system performance in processing of the data units by the load balancer.

18 Claims, 10 Drawing Sheets

(56) References Cited

U.S. PATENT DOCUMENTS

| | | | |
|---|---|---|---|
| 6,980,521 B1* | 12/2005 | Jarvis | H04L 45/00 370/238 |
| 8,259,585 B1* | 9/2012 | S P | H04L 45/125 370/237 |
| 8,797,877 B1* | 8/2014 | Perla | H04L 49/90 370/235 |
| 9,049,137 B1* | 6/2015 | Markine | H04L 47/125 |
| 9,270,598 B1* | 2/2016 | Oran | H04L 45/22 |
| 9,397,814 B2* | 7/2016 | Yang | H04L 1/1896 |
| 10,498,897 B1* | 12/2019 | Chadha | H04M 3/5234 |
| 2003/0067876 A1* | 4/2003 | Sharma | H04L 49/1523 370/232 |
| 2005/0153704 A1* | 7/2005 | Luss | H04W 16/18 455/453 |
| 2005/0240935 A1* | 10/2005 | Ramanathan | G06F 9/505 718/105 |
| 2005/0243723 A1* | 11/2005 | Randriamasy | H04L 45/00 370/235 |
| 2007/0028051 A1* | 2/2007 | Williamson | G06F 12/0864 711/128 |
| 2010/0214913 A1* | 8/2010 | Kompella | H04L 45/745 370/230 |
| 2011/0128960 A1* | 6/2011 | Bando | H04L 45/745 370/392 |
| 2011/0273987 A1* | 11/2011 | Schlansker | H04L 12/462 370/235 |
| 2013/0121216 A1* | 5/2013 | Chen | H04L 5/0005 370/280 |
| 2013/0125127 A1* | 5/2013 | Mital | H04L 49/101 718/102 |
| 2013/0142205 A1* | 6/2013 | Munoz | H04L 47/2441 370/419 |
| 2014/0325524 A1* | 10/2014 | Zangaro | G06F 9/5083 718/105 |
| 2014/0369351 A1* | 12/2014 | Singh | H04L 49/552 370/390 |
| 2015/0043397 A1* | 2/2015 | Hsieh | H04L 5/1469 370/280 |
| 2016/0173451 A1* | 6/2016 | Banville | H04L 47/6295 726/13 |
| 2016/0248675 A1* | 8/2016 | Zheng | H04L 47/11 |
| 2017/0255498 A1* | 9/2017 | King-Smith | G06F 9/5027 |
| 2017/0257849 A1* | 9/2017 | Oketani | H04L 1/1812 |
| 2018/0007126 A1* | 1/2018 | Borst | H04L 67/1023 |
| 2018/0034724 A1* | 2/2018 | Fedyk | H04L 45/24 |
| 2018/0337752 A1* | 11/2018 | Choi | H04B 7/26 |
| 2020/0106561 A1* | 4/2020 | Choi | H04L 1/1858 |

OTHER PUBLICATIONS

Extended European Search Report for Patent Application No. 20154195.0, dated Aug. 11, 2020, 9 pages.

* cited by examiner

| BIN | DEST | #HITS |
|---|---|---|
| 0 | DEST 1 | 52 |
| 1 | DEST 2 | 20 |
| 2 | DEST 3 | 0 |
| 3 | DEST 4 | 87 |
| 4 | DEST 1 | 8 |
| 5 | DEST 2 | 118 |
| 6 | DEST 3 | 22 |
| 7 | DEST 4 | 0 |
| 8 | DEST 1 | 70 |
| 9 | DEST 2 | 134 |
| 10 | DEST 3 | 97 |
| 11 | DEST 4 | 0 |
| 12 | DEST 1 | 122 |
| 13 | DEST 2 | 92 |
| 14 | DEST 3 | 14 |
| 15 | DEST 4 | 164 |
|  |  | 1000 |

| DEST | #HITS | EXPECTED | DIFF |
|---|---|---|---|
| DEST 1 | 252 | 250 | 1.008 |
| DEST 2 | 364 | 250 | 1.456 |
| DEST 3 | 133 | 250 | 0.532 |
| DEST 4 | 251 | 250 | 1.004 |

|  | 704 | 706 | 708 | 710 | 712 |
|---|---|---|---|---|---|
| DEST | #HITS | ADJUST | ADJUSTED #HITS | EXPECTED | ADJ DIFF |
| DEST 1 | 252 | 0 | 252 | 250 | 1.008 |
| DEST 2 | 364 | -118 | 246 | 250 | 0.984 |
| DEST 3 | 133 | 118 | 251 | 250 | 1.004 |
| DEST 4 | 251 | 0 | 251 | 250 | 1.004 |

SOFTWARE ASSISTED HASHING TO IMPROVE DISTRIBUTION OF A LOAD BALANCER

BACKGROUND

The field of invention relates generally to hashing functions in computing systems, and, more specifically, to systems and methods for improving distribution in hashing for a load balancer.

Hash functions generally work very well with a large uniform input distribution. However, a non-uniform input distribution and/or an input distribution with very few flows may result in poor binning. For example, when an error detecting code such as a cyclic redundancy code (CRC) is used as a hash function in a load balancer of a switch (e.g., to select a destination port/host), it can cause system performance problems with non-uniform input distributions. An example of a CRC used in load balancing operations is CRC32, an error-detecting function that uses a CRC32 algorithm to detect changes between source and target data. Non-uniform sequential input distributions are especially common in data centers where host computer servers are assigned sequential Media Access Control (MAC) or Internet Protocol (IP) addresses. Very few flows can also result in poor binning even if the hash function manages non-uniform input distributions well. For example, for a load balancer with eight input flows and four destination ports there is a significant probability that at least one of the destination ports will be oversubscribed while at least one other destination port will be undersubscribed. This negatively affects system performance.

DETAILED DESCRIPTION

Embodiments of the present invention dynamically re-assign hash bins of a hardware-implemented hash function based on actual data flows. Actual data flows are identified through sampling and analyzed by a hash adjuster component implemented in software to periodically update the assignment of hash bins to reduce unfairness. Embodiments of the present invention decrease unfair load balancing scenarios, which can result in poor resource utilization and reduced system performance. Embodiments are independent of the underlying hashing algorithm used by a hash function implemented in load balancer hardware. Embodiments are more flexible than fixed load balancer hardware when processing different traffic patterns (such as non-uniform input distribution and/or an input distribution with very few flows and/or flows with high bandwidth).

Figure 1:
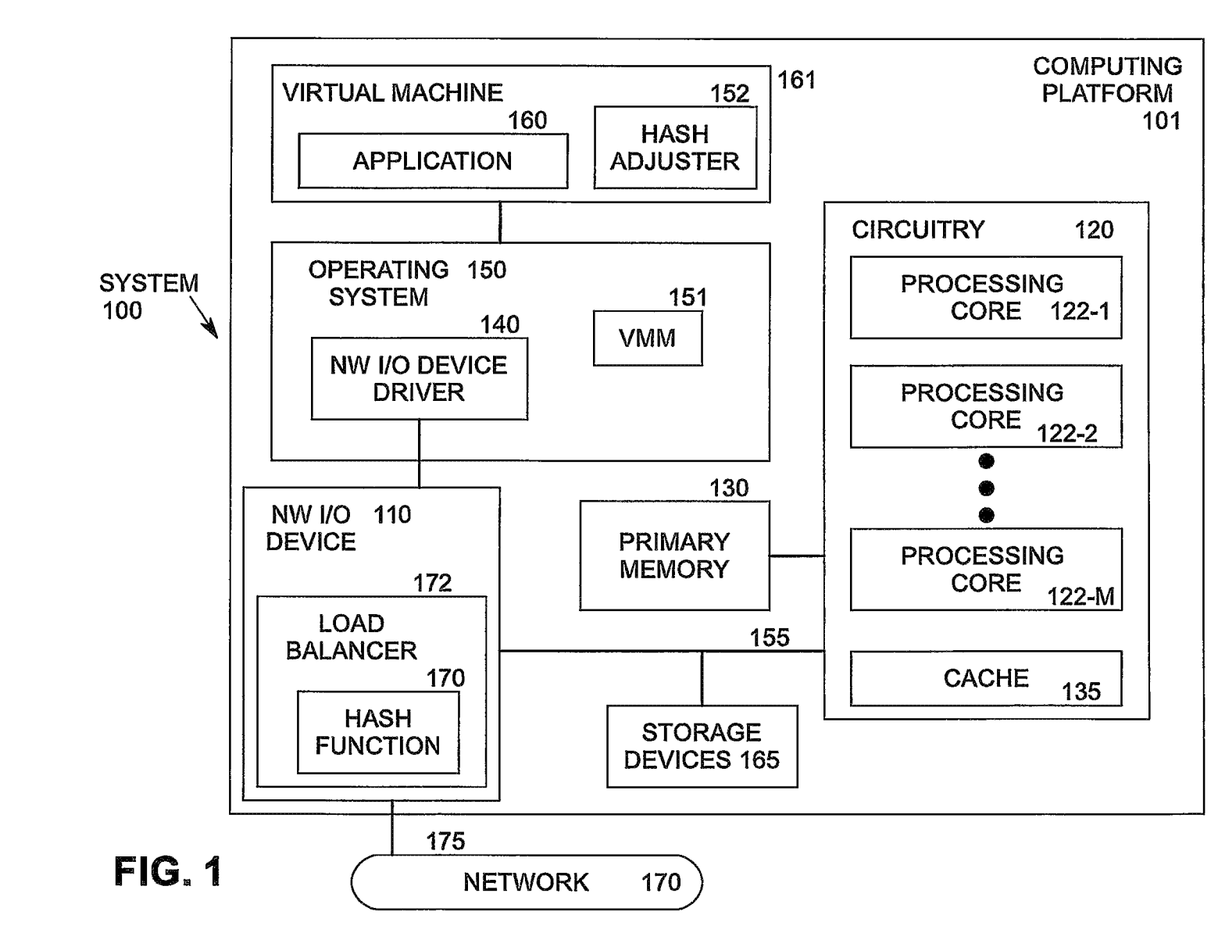
FIG. 1 illustrates an example computing system according to some embodiments.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network (NW) input/output (I/O) device 110. In an embodiment, network I/O device 110 comprises a switch, a network interface controller (NIC) having one or more destination ports (not shown) connected or coupled to network communication channel 175, and a load balancer 172. In an embodiment, network communication channel 175 includes a PHY device (not shown). In an embodiment, network I/O device 110 includes an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, operating system (OS) 150, NW I/O device driver 140, virtual machine manager (VMM) (also known as a hypervisor) 151, at least one application 160 running in a virtual machine (VM) 161, a hash adjuster 152 running in user space (and in VM 161), and one or more storage devices 165. In one embodiment, OS 150 is Linux™. In another embodiment, OS 150 is Windows® Server. Other OSs may also be used. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In one embodiment, application 160 is a packet processing application operating in user mode.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, hash adjuster 152, VM 161, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-*m*, where "m" is any positive whole integer greater than 2. In an embodiment, OS 150, VMM 151, NW I/O device driver 140, hash adjuster 152, VM 161 and application 160 are executed by one or more processing cores 122-1 to 122-*m*.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

In some examples, computing platform 101 includes network (NW) I/O device 110 having a load balancer 172 implemented as a hardware component. Load balancer 172 includes hash function 170 implemented in hardware to assist in efficiently balancing the flow of packets through network I/O device 110 by determining which destination port is to be used for a given packet. Hash function 170 applies a selected hash algorithm to packet data to determine a hash bin associated with a selected destination port. In some embodiments, hash adjuster 152 running in user space provides a software interface to load balancer 172 to adjust the usage of hash function 170 based on collected statistical data. In other embodiments, hash adjuster 152 is part of OS 150 and runs in kernel space. In some embodiments, hash adjuster 152 is implemented in firmware in computing platform 101.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

In at least one embodiment load balancer 172 is coupled to processor 122 or a programmable micro-controller (not shown), load balancer 172 can sample data flows to and/or from processor 122 or a programmable micro-controller, and assignment of hash bins in hash function 170 can be controlled individually by hash adjuster 152.

Figure 2:
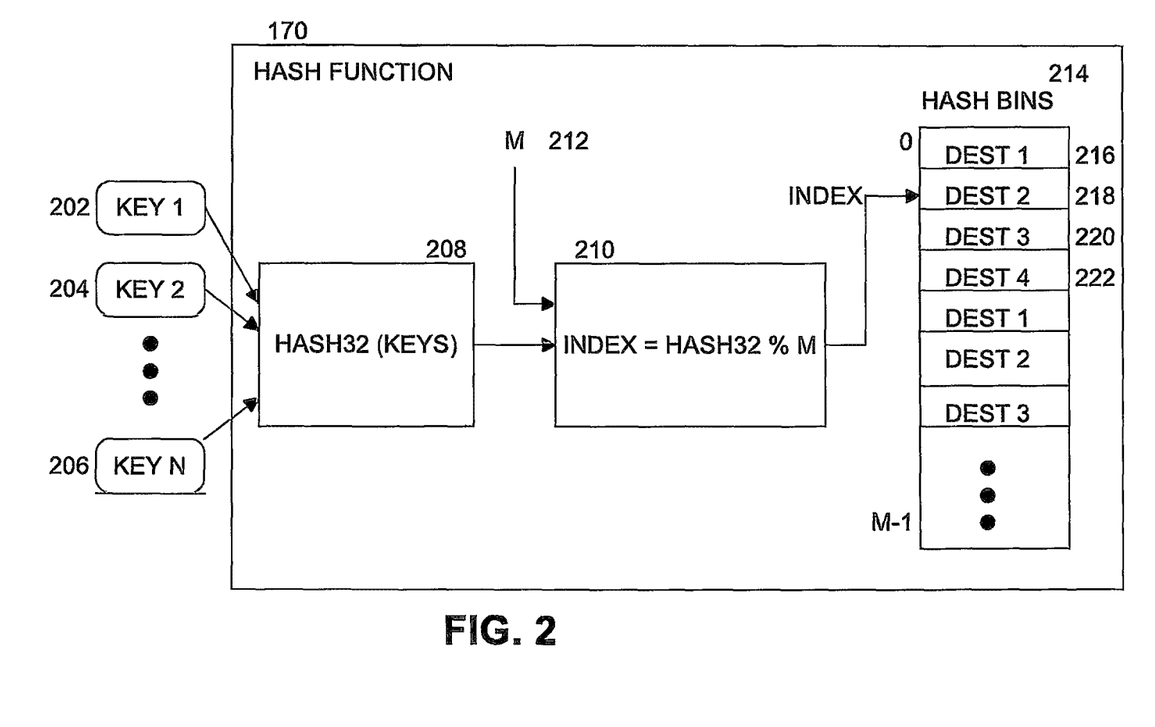
FIG. 2 illustrates an example of a hash function and hash bins.

FIG. 2 illustrates an example of a hash function 170 and hash bins 214. Initially the number of hash bins to use for the load balanced traffic processed by network I/O device 110 is selected and the hash bins are assigned destination identifiers (IDs) using either modulo or division binning. In an embodiment, assignment of destination IDs to hash bin is controlled by hash adjuster 152. FIG. 2 shows an example hash function 170 that has M 212 number of hash bins and four destinations (e.g., destination (dest) 1, destination 2, destination 3, and destination 4, with M being a natural number. Although the number of destinations is four in this example, any number of destinations as supported by load balancer 172 and network I/O device 110 may be used. In this example, destinations are initially assigned to hash bins as shown. In one embodiment, the initial assignment is a round robin assignment where the destinations are assigned to consecutive hash bins in order and the process repeats until all hash bins have destinations assign to them. For example, destination 1 is assigned to hash bin 216, destination 2 is assigned to hash bin 218, destination 3 is assigned to hash bin 220 and destination 4 is assigned to hash bin 222 as shown. Hash function 170 accepts N number of input keys, such as key 1 202, key 2 204, . . . key N 206, where N is a natural number. In one embodiment, the keys are obtained by load balancer 172 from L2/L3/L4 packet header information and the hash function is independent from the selected keys. When a packet is received by load balancer 172, the load balancer obtains the key for the packet and inputs the key to first hash component 208 (Hash32 (Keys)). First hash component 208 applies a predetermined hash computation on the key input to produce an output value. The output value is input to second hash component 210 to compute an index into hash bins 214 based at least in part on the number of hash bins M 212. In some embodiments, first hash component 208 and second hash component 210 are implemented as one integral component in load balancer hardware. In some embodiments, the index is determined using modulo arithmetic (thus scaling the index to the number of entries in hash bins 214). In other embodiments, other methods are used to determine the index based at least in part on the key. The computed index points to an entry in hash bins 214. The packet is then assigned to the destination previously assigned to the hash bin indicated by the index. This process is repeated for each packet processed by load balancer 172. Although packets are used an example herein, any data unit being assigned to any destination in a computing system based on hashing may be processed according to embodiments of the present invention.

Next, the load balanced traffic is sampled to measure how fairly the hash function is assigning packets to destinations, since unequal/unfair assignments can result in performance degradation. The sampling rate is dependent on the processor used to analyze the data flows. The sampling rate is also dependent on the number of destinations (e.g., ports) and their processing speed/throughput rating. A destination port capable of handling 10 billions of bits per second (Gbps) with full usage can forward up to 15 million packets per second for small packet sizes and about 5 million packets per second for average packet sizes. Hash adjuster 152 must find a good balance between processor usage and the desired accuracy of adjustment of destination assignments for the hash bins. For example, assume load balancer 172 has four destinations (e.g., destination 1, destination 2, destination 3, and destination 4) with a speed of 10 Gbps each, the usage is approximately 50%, and the average packet size is 256 bytes. If the goal is to sample about 1,000 packets per second to assist the load balancer 172 in achieving fairness, hash adjuster 152 would have to set the sampling rate to 1 out of every 10,000 packets.

Total packets=((10,000,000,000 bps *4* 50%)/(256 B*8b))

Total packets=~10,000,000 packets/second

Sampling 1 packet every 10,000 packets should reach the goal of 1,000 packets per second on average. A sampled packet can be truncated to only include the L2/L3/L4 packet header information used as keys 202, 204, . . . 206 by the hash function 170.

Every sampled packet is software binned by hash adjuster 152 using the same hash function 208, 210 with the same keys as in load balancer hardware 172 to statistically compute the usage of each hash bin and destination.

Hash adjuster 152 analyzes the sampled window after either a time metric or a packet metric. A time metric can be set to analyze the sampled statistic every x seconds, while a packet metric can be set to analyze the sampled statistic every y sampled packets. In this example a packet metric with 1000 packets is chosen as the threshold.

Figure 3:
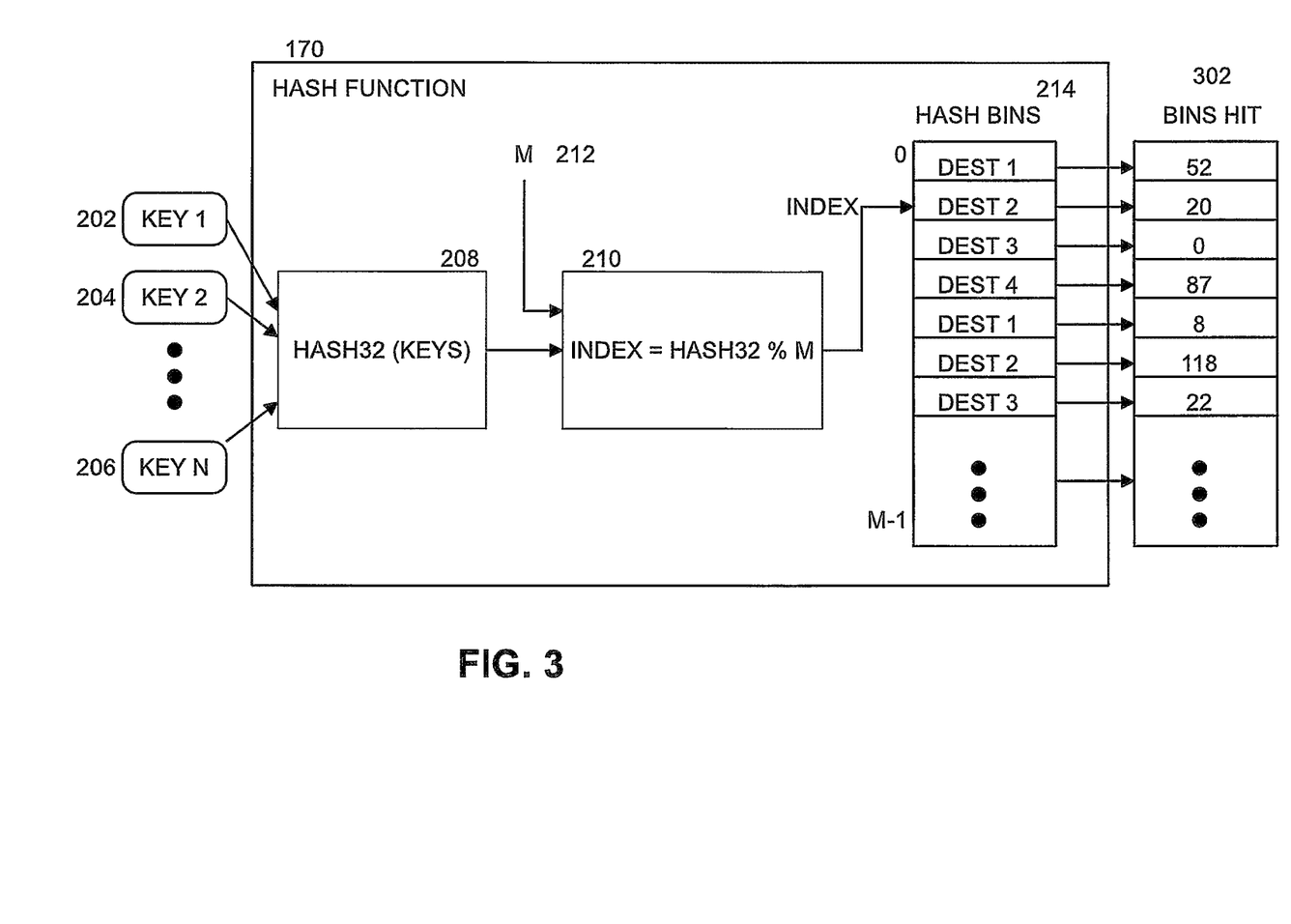
FIG. 3 illustrates an example of a hash function, hash bins, and a table of hash bin counts according to some embodiments.

FIG. 3 illustrates an example of a hash function 170, hash bins 214, and a table of hash bin counts 302 according to some embodiments. Hash adjuster 152 computes the bin counts in bin count table 302 based on the sampled statistics. That is, every time the hash function assigns a packet to a destination and thus to a hash bin associated with the destination, hash adjuster 152 increments that hash bin's "hit" count. Thus, once populated bin count table 302 is a statistical representation of the distribution of packets to destinations/hash bins by hash function 170 during the sampled window.

Figure 4:
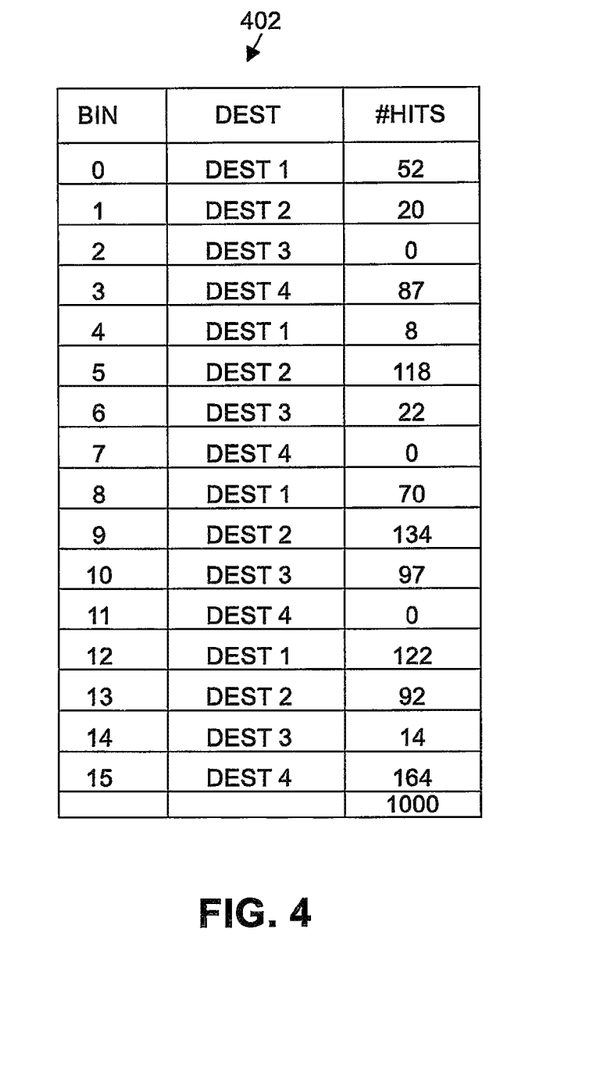
FIG. 4 illustrates an example of a table of hash bin counts according to some embodiments.

FIG. 4 illustrates an example of a table 402 of hash bin counts according to some embodiments. In an embodiment, the hash bin count table is stored in primary memory 130. In this example, there are 16 bins (e.g., M=16) and the number of destinations is four. In a round robin distribution of destinations to hash bins, each destination is assigned to four hash bins (16/4) as shown. The number of hits (#hits) is the count of the number of packets assigned to a hash bin during the sampled window. In this example, it is apparent that the distribution is not uniform since the number of hits for destinations varies widely, which may result in negative system performance.

Figure 5:
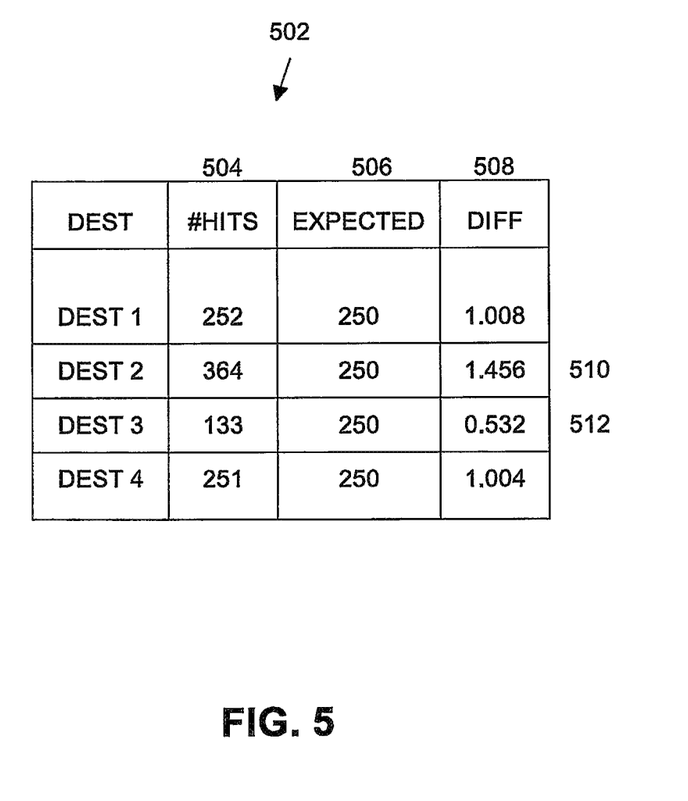
FIG. 5 illustrates an example of a table of hash bin counts and count differentials according to some embodiments.

FIG. 5 illustrates an example of a table 502 of hash bin counts and count differentials according to some embodiments. In an embodiment, table 502 is stored in primary memory 130. Hash adjuster 152 computes a count differential measurement 508 based on the measured number of hits 504 and the expected number of hits 506 per hash bin. In an embodiment, the expected number of hits for a bin is the total number of packets processed in the sampling window divided by the number of destinations. In some embodiments, tables 302, 402, and 502 are combined into one table.

In this example, it is apparent that the count differential for destination 2 indicates that hash bins for destination 2 are oversubscribed 510, and the count differential for destination 3 indicates that hash bins for destination 3 are undersubscribed 512. This indicates a sub-optimal distribution affecting system performance.

Thus, the example shows a situation where two destinations have a number of actual hits as expected (destinations 1 and 4, where the differential is close to 1) during the sampling window, while the two other destinations are unbalanced (destinations 2 and 3, where the differentials are not close to 1) during the sampling window. Destination 2 forwarded 36.4% of the load balanced traffic while it was expected to only receive 25%. On the other hand, destination 3 only forwarded 13.3% instead of the expected 25%. Hash bins statistics are shown in this example to better illustrate how hash adjuster 152 rebalance the assignment of destinations to hash bins.

The number of bins selected for this example is 16 such that every destination is assigned to four hash bins. Having a large number of hash bins versus number of destinations gives more flexibility to better balance the packet traffic. In various embodiments, a destination can be a port and/or a next hop and/or a virtual machine (VM). In various embodiments, it is also possible to purposely distribute the traffic unevenly on one or more destinations. In that case it is better to increase the number of hash bins versus the number of destinations ratio to increase the granularity on which traffic can be distributed among destinations.

Figure 6:
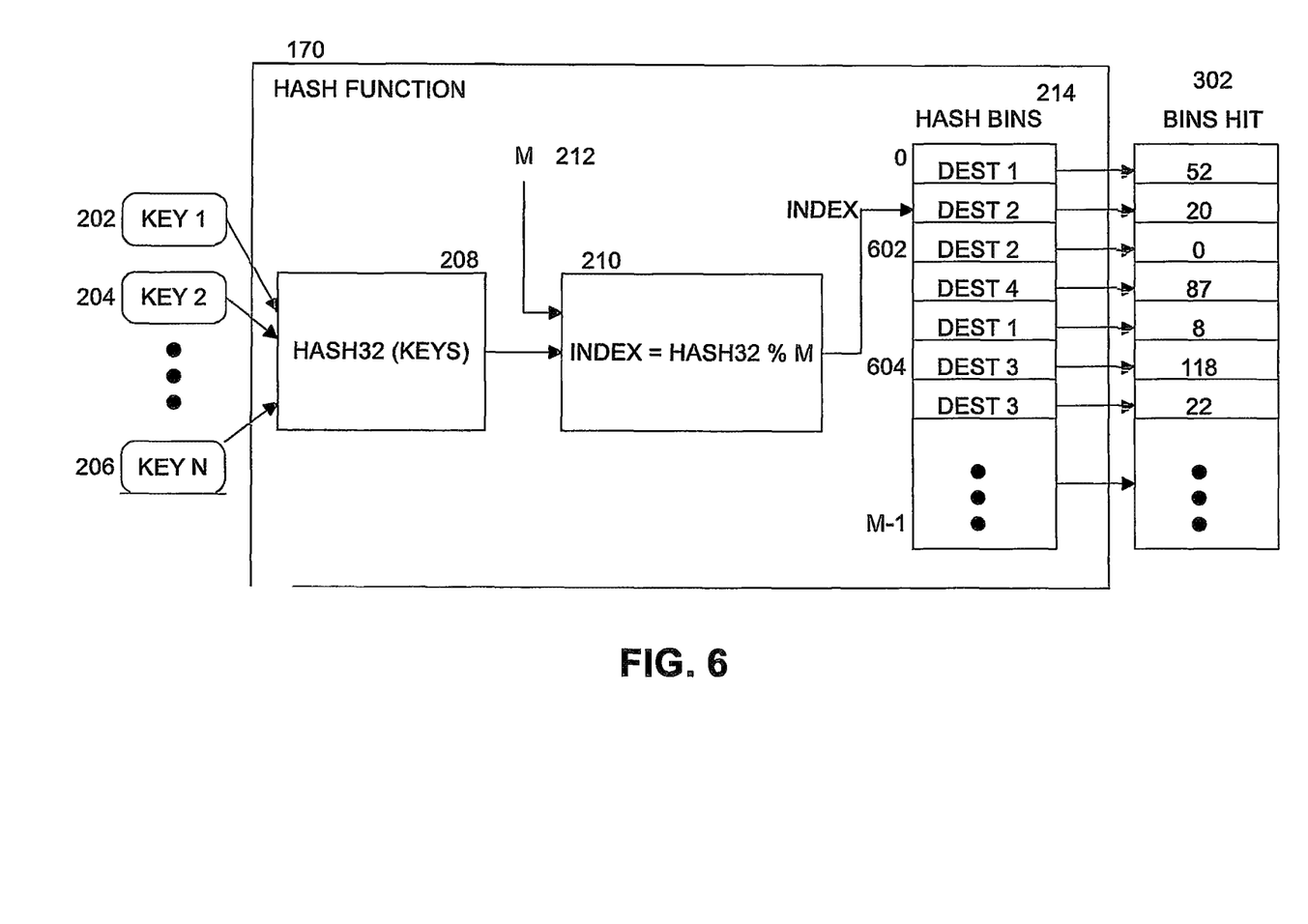
FIG. 6 illustrates an example of a table of hash bin counts with adjusted hash bins according to some embodiments.

The next step is to identify unfairness in packet flow to destinations and reassign destinations among hash bins to seek to reduce the difference between the expected distribution and the actual distribution for subsequent processing of packets. FIG. 6 illustrates an example of a table 302 of hash bin counts with adjusted hash bins according to some embodiments. For example, exchanging the destinations assigned to hash bin 602 and 604 should reduce the disparity between destination usages (e.g., reassign hash bin 602 from destination 3 to destination 2 and reassign hash bin 604 from destination 2 to destination 3). A plurality of destination assignment exchanges is performed programmatically by hash adjuster 152 and communicated to load balancer 172 according to the values in hash bin count table 302.

Figure 7:
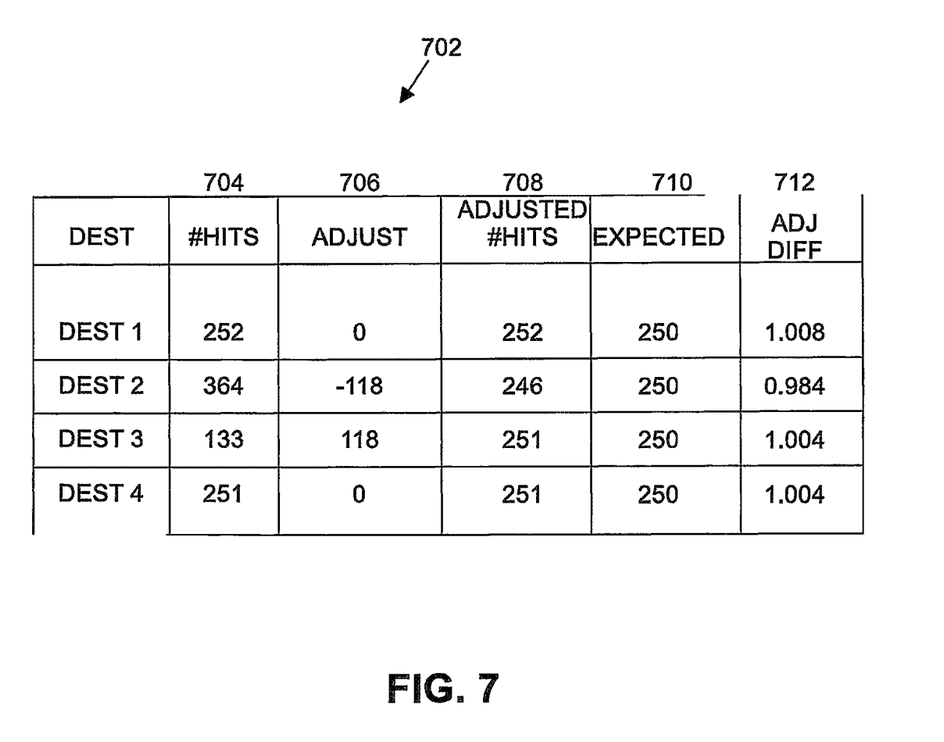
FIG. 7 illustrates an example of a table of hash bin counts with adjusted hash bins and count differentials according to some embodiments.

FIG. 7 illustrates an example of a table 702 of hash bin counts with adjusted hash bins and count differentials according to some embodiments. Columns for number of hits 704 and expected number of hits 710 are the same as in FIG. 5. By exchanging assignments of destinations for hash bins 602 and 604, the adjusted counts 706 for destination 2 and destination 3 have changed. In this example, exchanging the hash bin assignments results in 118 hits being subtracted from the number of hits for destination 2 and 118 hits being added to the number of hits for destination 3. The adjusted number of hits is shown in column 710. Note that the number of adjusted hits in column 708 for all destinations are now closer to the same value than before the exchange. In an embodiment, hash adjuster 152 then computes the adjusted differential in column 712 based on the adjusted number of hits for each destination and the expected number of hits. Swapping the two assignments of destinations to hash bins reduces the disparity between the most and the least used destination to around 2% versus 50% in this example without applying embodiments of the present invention. This results in better system performance.

Finally, the hash bin and destination usage for the next sampling window are reset and a new sampling window is started. Sampling and adjustment of destination assignments to hash binds can be repeated as needed. The frequency of the sampling and adjustment is implementation dependent. In an embodiment, one or more of the previous sampling window statistics can optionally be kept over a period of time or number of iterations in order to base any hash bin exchange decisions on a moving average value of the z last sampling windows.

Figure 8:
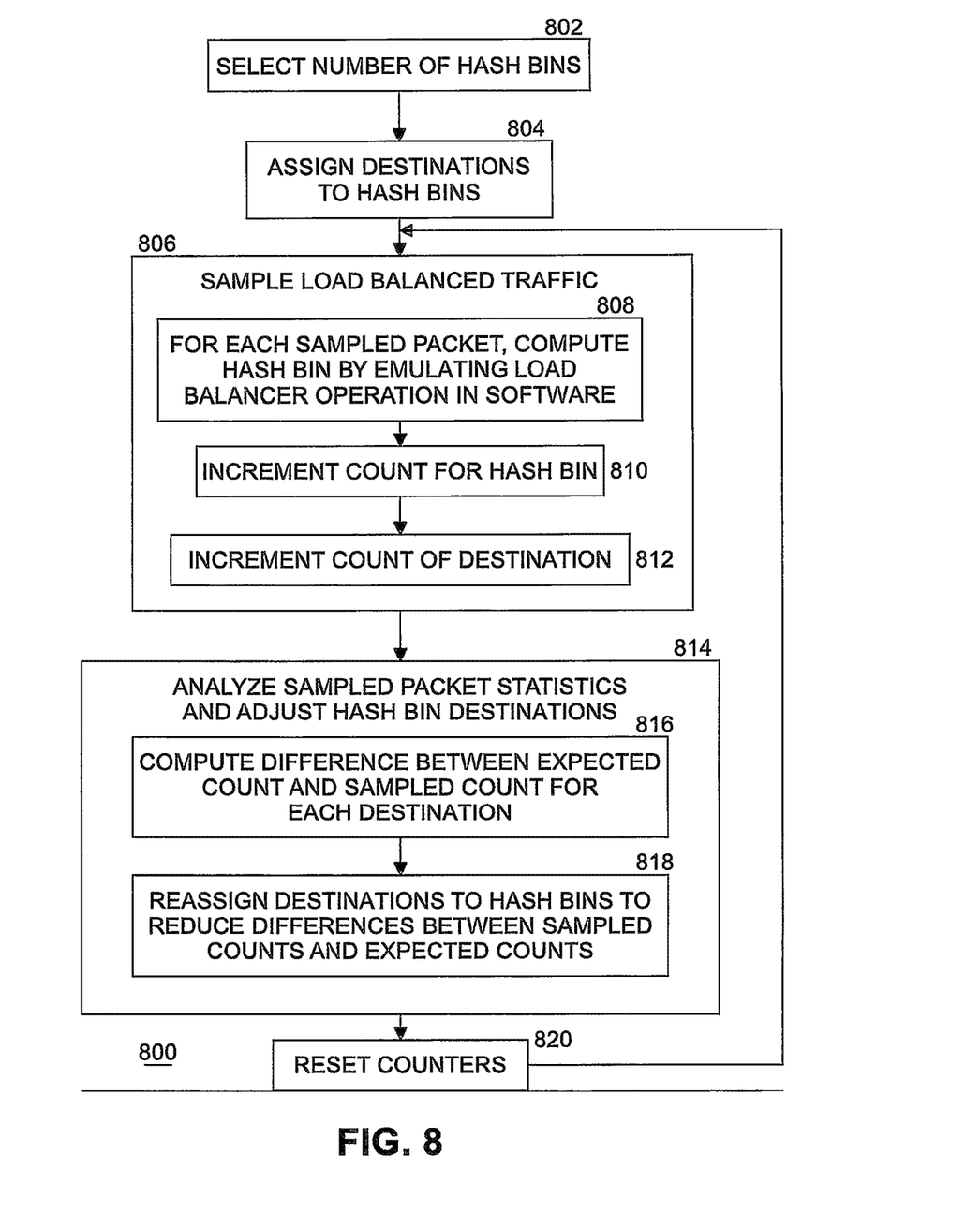
FIG. 8 is a flow diagram of an example of hash adjuster processing according to some embodiments.

FIG. 8 is a flow diagram of an example of hash adjuster 152 processing according to some embodiments. At block 802, hash adjuster selects a number of hash bins to analyze. In an embodiment, the number of hash bins to analyze (e.g., M 212 above in FIG. 2) is the maximum number of hash bins supported by load balancer 172. In another embodiment, the number of hash bins to analyze is less than the maximum number of hash bins supported (e.g., a selected subset). At block 804, hash adjuster 152 assigns destinations to hash bins using either modulo arithmetic or division binning. In an embodiment, assignment of destinations to hash bins is done round robin. In an embodiment, the initial assignment of destinations to hash bins is communicated to load balancer 172 for use by load balancer in processing packets over an application programming interface (API). Next, at block 806 hash adjuster samples load balanced traffic processed by load balancer 172 by performing blocks 808, 810, and 812. At block 808, for each sampled packet, hash adjuster computes the hash bin for the packet by emulating load balancer 172 operation in software (e.g., hash adjuster applies the logical and/or mathematical equivalent of hash function 170 in software to each sampled packet to determine which hash bin is to be used for the sampled packet). At block 810, hash adjuster increments the count for the hash bin used at block 810 in table of hash bin counts 302. At block 812, hash adjuster increments the count for the destination used at block 810. In an embodiment, this is stored in a table such as table 702. In this way, hash adjuster maintains a count of the number of hits for each hash bin and the number of hits for each destination during the current sampling window. In an embodiment, the sampling of block 806 is performed once for every predetermined x number of packets being processed by load balancer 172, where x is natural number.

At block 814, hash adjuster 152 periodically analyzes the packet statistics determined at block 806 (e.g., the counts stored in tables 302, 402, 502, and/or 702) and adjusts destinations assigned to hash bins accordingly by performing blocks 816 and 818. Analysis of the packet statistics may be done at any predetermined period of time, or the timing of the analysis may be dynamically changed by hash adjuster 152 based at least in part on a measurement of packet traffic in computing platform 101. In an embodiment, changing the timing of gathering of packet statistics and ensuring adjustment of destination assignments to hash bins is performed at the request of a system administrator of computing platform 101. At block 816, the hash adjuster computes the difference between an expected count and a count for each destination for the sampled window by reference to, for example, table 502 of hash bin counts and differentials. Each computed differential is stored in the table of hash bin counts and differentials. At block 818, the hash adjuster reassigns destinations to hash bins to reduce differences between the sampled counts and the expected counts for the current sampling window. In an embodiment, the reassignments are caused by hash adjuster calling an API to load balancer 172. In an embodiment, hash adjuster 152 repeatedly exchanges the assignments of two selected destinations to two selected hash bins, respectively, in order to bring the adjustment differential for those two destinations closer to one. This results in better system performance. Exchanges are performed until an ending boundary condition is reached, such as when the all differentials are lower than a predetermined value. At block 820, hash adjuster 152 resets the counters for the hash bins and for the destinations to prepare the counters for the next sampling window. Processing continues with block 806 at the appropriate time with the next sampling window. In some embodiments, after block 820 is performed, hash adjuster 152 reports results (e.g., table 702 of hash bin counts with adjusted hash bins and differentials) of the hash function reassignments and/or packet statistics to application 160. In an embodiment, such results are made visible to a system administrator of computing platform 101.

In one embodiment, a moving average of packet statistics is used to make destination reassignment decisions. In this embodiment the number of hits per hash bin and the number of hits per destination are accumulated over a plurality of sampling windows. The number of sampling windows to aggregate the packet statistics is implementation dependent.

Figure 9:
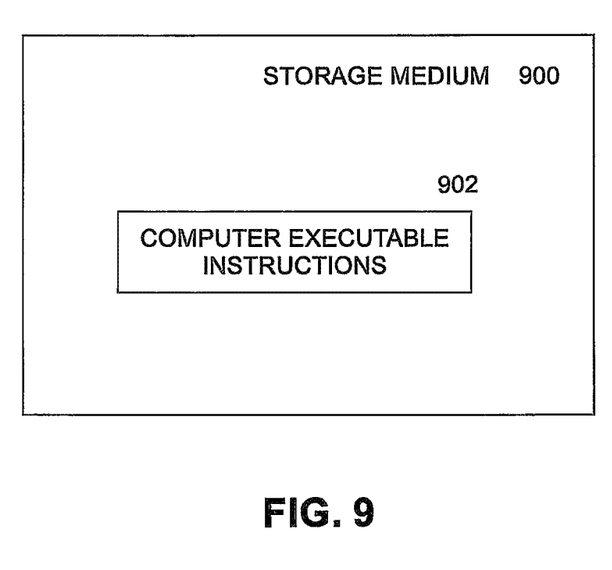
FIG. 9 illustrates an example of a storage medium.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions 902 to implement logic flows 800 described above in FIG. 8. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
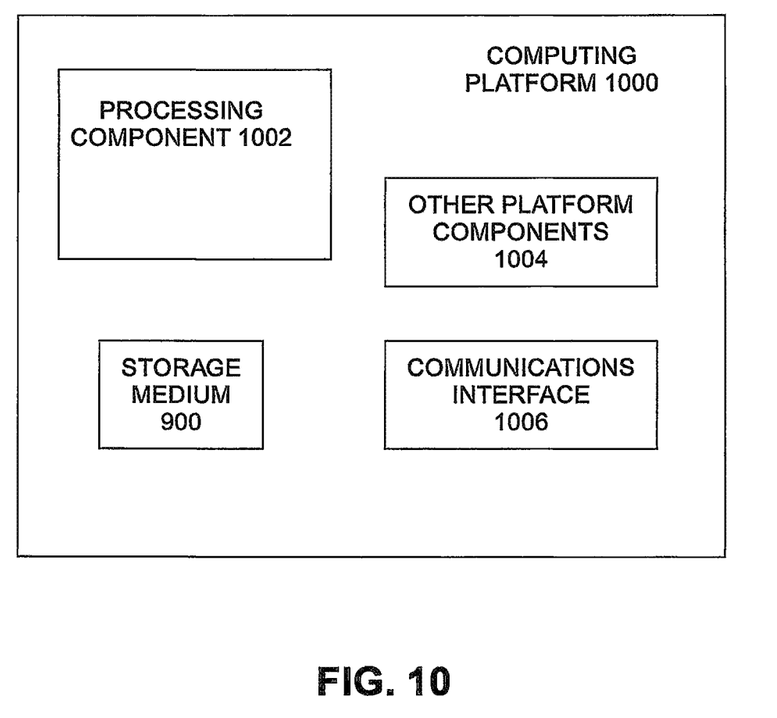
FIG. 10 illustrates another example computing platform.

FIG. 10 illustrates an example computing platform 1000. In some examples, as shown in FIG. 10, computing platform 1000 may include a processing component 1002, other platform components 1004 and/or a communications interface 1006.

According to some examples, processing component 1002 may execute processing operations or logic for instructions stored on storage medium 900. Processing component 1002 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1004 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAIVI that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1006 may include logic and/or features to support a communication interface. For these examples, communications interface 1006 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1000, including logic represented by the instructions stored on storage medium 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
   a network input/output (I/O) device, the network I/O device including
      load balancer circuitry to assign packets to destination I/O ports; the load balancer circuitry including
         a hash function, the hash function including
            M hash bins, where M is a natural number, each hash bin being associated with a destination I/O port;
         a first hash component obtaining a key from a header of a packet received by the network I/O device and to apply a first hash computation on the key to produce an output value; and
         a second hash component computing an index into the M hash bins based at least in part on the output value and a number of hash bins M;
      wherein the load balancer circuitry is to assign the packet to the hash bin selected by the index; and
      wherein the network I/O device is to forward the packet to a destination I/O port associated with the hash bin selected by the index; and
   a processor; and
   a memory coupled to the processor, the memory having instructions stored thereon that, in response to execution by the processor, cause the processor to:
      assign a destination I/O port to each of the M hash bins;
      sample assignment of packets to hash bins by emulating processing by the load balancer circuitry of the network I/O device over a sample window;
      analyze the sampled assignments; and
      reassign destination I/O ports to the M hash bins in the load balancer circuitry in the network I/O device based at least in part on the analyzed sampled assignments.

2. The computing system of claim 1, wherein instructions to assign a destination I/O port to each of the M hash bins and instructions to reassign destination I/O ports to the M hash bins in the load balancer circuitry in the network I/O device based at least in part on the analyzed sampled assignments comprise instructions to communicate the assignments and reassignments to the load balancer circuitry in the network I/O device using an application programming interface (API).

3. The computing system of claim 1, wherein instructions to sample assignment of packets to hash bins by the load balancer circuitry in the network I/O device comprise instructions to
   for each packet sampled during the sample window, compute the hash bin for the sampled packet by emulating operation, by the processor, of the hash function of the load balancer circuitry in the network I/O device;
   increment a first count of a number of packets hashed to the hash bin during the sample window; and
   increment a second count of a number of packets forwarded to the destination I/O port assigned to the hash bin during the sample window.

4. The computing system of claim 3, wherein instructions to analyze the sampled assignments comprise instructions to for each destination I/O port, compute a difference between an expected count of packets assigned to the destination I/O port and the second count of packets forwarded to the destination I/O port.

5. The computing system of claim 4, wherein instructions to reassign destination I/O ports to hash bins comprise instructions to reassign destination I/O ports to hash bins to reduce differences between the expected counts and the second counts.

6. The computing system of claim 4, wherein instructions to reassign destination I/O ports to the hash bins comprises instructions to exchange assignments of two selected destination I/O ports to two selected hash bins; and repeat exchanges until a boundary condition is reached.

7. The computing system of claim 6, wherein instructions to repeat exchanges until a boundary condition is reached comprise instructions to repeat exchanges until differences between the expected counts and the second counts are less than a predetermined value.

8. A method to be performed by a processor, comprising:
   assigning a destination I/O port to each of M hash bins of a hash function implemented in load balancer circuitry of a network input/output (I/O) device, where M is a natural number, each hash bin being associated with a destination I/O port;
   sampling assignment of packets to hash bins by emulating processing of the load balancer circuitry of the network I/O device over a sample window;
   analyzing the sampled assignments; and
   reassigning destination I/O ports to the M hash bins in the load balancer circuitry in the network I/O device based at least in part on the analyzed sampled assignments,
   wherein the load balancer circuitry obtains, by a first hash component of the load balancer circuitry, a key from a header of a packet received by the network I/O device and applies a first hash computation on the key to produce an output value; and computes, by a second hash component of the load balancer circuitry, an index into the M hash bins based at least in part on the output value and M; wherein the load balancer circuitry assigns the packet to the hash bin selected by the index; and forwards, by the network I/O device, the packet to a destination I/O port associated with the hash bin selected by the index.

9. The method of claim 8, wherein assigning a destination I/O port to each of the M hash bins and reassigning destination I/O ports to the M hash bins based at least in part on the analyzed sampled assignments comprises communicating the assignments and reassignments to the load balancer circuitry in the network I/O device using an application programming interface (API).

10. The method of claim 8, wherein sampling assignment of packets to hash bins by the load balancer circuitry in the network I/O device comprises
for each packet sampled during the sample window, computing the hash bin for the sampled packet by emulating operation, by the processor, of the hash function of the load balancer circuitry in the network I/O device;
incrementing a first count of a number of packets hashed to the hash bin during the sample window;
incrementing a second count of a number of packets forwarded to the destination assigned to the hash bin during the sample window.

11. The method of claim 10, wherein analyzing the sampled assignments comprises for each destination I/O port, computing a difference between an expected count of packets assigned to the destination I/O port and the second count of packets forwarded to the destination I/O port.

12. The method of claim 11, wherein reassigning destination I/O ports to hash bins comprises reassigning destination I/O ports to hash bins to reduce differences between the expected counts and the second counts.

13. The method of claim 11, wherein reassigning destination I/O ports to the hash bins comprises exchanging assignments of two selected destination I/O ports to two selected hash bins; and repeating exchanges until a boundary condition is reached.

14. The method of claim 13, wherein repeating exchanges until a boundary condition is reached comprises repeating exchanges until differences between the expected counts and the second counts are less than a predetermined value.

15. At least one non-transitory tangible machine-readable medium comprising a plurality of instructions that in response to being executed by a processor cause the processor to:

assign a destination I/O port to each of M hash bins of a hash function implemented in load balancer circuitry of a network input/output (I/O) device, where M is a natural number, each hash bin being associated with a destination I/O port;
sample assignment of packets to hash bins by emulating processing of the load balancer circuitry of the network I/O device over a sample window;
analyze the sampled assignments; and
reassign destination I/O ports to the M hash bins in the load balancer circuitry in the network I/O device based at least in part on the analyzed sampled assignments;
wherein the load balancer circuitry obtains, by a first hash component of the load balancer circuitry, a key from a header of a packet received by the network I/O device and applies a first hash computation on the key to produce an output value; and computes, by a second hash component of the load balancer circuitry, an index into the M hash bins based at least in part on the output value and M; wherein the load balancer circuitry assigns the packet to the hash bin selected by the index; and forwards, by the network I/O device, the packet to a destination I/O port associated with the hash bin selected by the index.

16. The at least one non-transitory tangible machine-readable medium of claim 15, wherein instructions to sample assignment of data units to hash bins by the load balancer circuitry comprise instructions to
for each packet sampled during the sample window, compute the hash bin for the sampled packet by emulating operation, by the processor, of the hash function of the load balancer circuitry of the network I/O device;
increment a first count of a number of packets hashed to the hash bin during the sample window;
increment a second count of a number of packets forwarded to the destination assigned to the hash bin during the sample window.

17. The at least one non-transitory tangible machine-readable medium of claim 16, wherein instructions to analyze the sampled assignments comprise instructions to for each destination I/O port, compute a difference between an expected count of packets assigned to the destination I/O port and the second count of packets forwarded to the destination I/O port.

18. The at least one non-transitory tangible machine-readable medium of claim 17, wherein instructions to reassign destination I/O ports to hash bins comprise instructions to reassign destination I/O ports to hash bins to reduce differences between the expected counts and the second counts.

* * * * *